United States Patent
Semersky et al.

(10) Patent No.: US 9,694,515 B2
(45) Date of Patent: Jul. 4, 2017

(54) OVERMOLDED CONTAINER HAVING AN INNER FOAMED LAYER

(75) Inventors: Frank E. Semersky, Holland, OH (US); William D. Voyles, Toledo, OH (US)

(73) Assignee: PLASTIC TECHNOLOGIES, INC., Holland, OH (US)

( * ) Notice: Subject to any disclaimer, the term of this patent is extended or adjusted under 35 U.S.C. 154(b) by 817 days.

(21) Appl. No.: 12/778,291

(22) Filed: May 12, 2010

(65) Prior Publication Data

US 2010/0227092 A1 Sep. 9, 2010

Related U.S. Application Data

(63) Continuation-in-part of application No. 12/144,885, filed on Jun. 24, 2008, which is a continuation-in-part
(Continued)

(51) Int. Cl.
*B29D 22/00* (2006.01)
*B29B 11/14* (2006.01)
(Continued)

(52) U.S. Cl.
CPC .......... *B29B 11/14* (2013.01); *B29C 44/0461* (2013.01); *B29C 45/1684* (2013.01); *B29C 49/221* (2013.01); *B32B 1/02* (2013.01); *B32B 5/20* (2013.01); *B32B 7/045* (2013.01); *B32B 27/065* (2013.01); *B32B 27/304* (2013.01); *B32B 27/308* (2013.01); *B32B 27/32* (2013.01); *B32B 27/34* (2013.01); *B32B 27/36* (2013.01); *B65D 1/023* (2013.01); *B65D 1/0207* (2013.01); *B65D 1/0215* (2013.01); *B65D 81/3846* (2013.01); *B29B 11/08* (2013.01); *B29B 11/10* (2013.01); *B29B 2911/1402* (2013.01); *B29B 2911/1404* (2013.01); *B29B 2911/1408* (2013.01); *B29B 2911/1414* (2013.01); *B29B 2911/1416* (2013.01); *B29B 2911/14026* (2013.01); *B29B 2911/14033* (2013.01); *B29B 2911/1444* (2013.01); *B29B 2911/14093* (2013.01); *B29B 2911/14106* (2013.01);
(Continued)

(58) Field of Classification Search
CPC . B29B 11/08; B29B 11/14; B29B 2911/1402; B29B 2911/14113; B29C 49/06; B29K 2067/00; B29K 2105/04; B32B 27/36; B32B 5/18; B65D 1/0207; B65D 81/3846; C08J 2203/06; C08J 2205/044
USPC ........................................................ 428/36.5
See application file for complete search history.

(56) References Cited

U.S. PATENT DOCUMENTS 3,645,837 A * 2/1972 Chisholm et al. ......... 428/316.6
3,880,973 A * 4/1975 Yoshikawa et al. .......... 264/521
(Continued)

FOREIGN PATENT DOCUMENTS

| CN | 1440353 A | 9/2003 |
|---|---|---|
| JP | 61-053021 A | 3/1986 |
| WO | 2006101631 A2 | 9/2006 |

*Primary Examiner* — James Yager
(74) *Attorney, Agent, or Firm* — Shumaker, Loop & Kendrick, LLP; Michael E. Dockins

(57) ABSTRACT

An overmolded preform and a container blow molded from the same are disclosed, wherein the overmolded preform and the overmolded container include an inner foamed layer.

5 Claims, 4 Drawing Sheets

Related U.S. Application Data of application No. 11/015,360, filed on Dec. 17, 2004, now abandoned, said application No. 12/144,885 is a continuation-in-part of application No. 10/684,611, filed on Oct. 14, 2003, now Pat. No. 7,588,810.

(60) Provisional application No. 60/545,049, filed on Feb. 17, 2004, provisional application No. 60/422,223, filed on Oct. 30, 2002.

(51) Int. Cl.

| | |
|---|---|
| B29C 44/04 | (2006.01) |
| B29C 45/16 | (2006.01) |
| B29C 49/22 | (2006.01) |
| B32B 27/36 | (2006.01) |
| B65D 1/02 | (2006.01) |
| B65D 81/38 | (2006.01) |
| B32B 5/20 | (2006.01) |
| B32B 7/04 | (2006.01) |
| B32B 27/06 | (2006.01) |
| B32B 27/30 | (2006.01) |
| B32B 27/32 | (2006.01) |
| B32B 27/34 | (2006.01) |
| B32B 1/02 | (2006.01) |
| B29B 11/08 | (2006.01) |
| B29B 11/10 | (2006.01) |
| B29C 45/17 | (2006.01) |
| B29C 49/06 | (2006.01) |
| B29C 49/64 | (2006.01) |
| B29C 35/08 | (2006.01) |
| B29K 27/06 | (2006.01) |
| B29K 67/00 | (2006.01) |
| B29K 77/00 | (2006.01) |
| B29K 105/04 | (2006.01) |
| B29K 105/00 | (2006.01) |
| B29L 31/00 | (2006.01) |

(52) U.S. Cl.
CPC ........... *B29B 2911/14113* (2013.01); *B29B 2911/14133* (2013.01); *B29B 2911/14326* (2013.01); *B29B 2911/14333* (2013.01); *B29C 45/1704* (2013.01); *B29C 49/06* (2013.01); *B29C 49/6418* (2013.01); *B29C 2035/0822* (2013.01); *B29C 2045/1722* (2013.01); *B29K 2027/06* (2013.01); *B29K 2067/00* (2013.01); *B29K 2077/00* (2013.01); *B29K 2105/04* (2013.01); *B29K 2105/258* (2013.01); *B29K 2995/0015* (2013.01); *B29L 2031/7158* (2013.01); *B32B 2266/025* (2013.01); *B32B 2266/0235* (2013.01); *B32B 2266/0242* (2013.01); *B32B 2266/0257* (2013.01); *B32B 2266/0264* (2013.01); *B32B 2270/00* (2013.01); *B32B 2307/304* (2013.01); *B32B 2307/402* (2013.01); *B32B 2307/7242* (2013.01); *B32B 2307/7244* (2013.01); *B32B 2439/60* (2013.01); *B32B 2439/70* (2013.01); *Y10T 428/1376* (2015.01)

(56) References Cited

U.S. PATENT DOCUMENTS

| | | | |
|---|---|---|---|
| 4,004,727 | A | 1/1977 | Rausing et al. |
| 4,318,489 | A * | 3/1982 | Snyder et al. ............... 215/375 |
| 4,874,649 | A * | 10/1989 | Daubenbuchel et al. ... 428/36.5 |
| 5,223,545 | A | 6/1993 | Kumar |
| 5,409,983 | A * | 4/1995 | Jones et al. ................. 524/439 |
| 5,618,486 | A | 4/1997 | Yoshimi et al. |
| 5,851,471 | A | 12/1998 | Schloss et al. |
| 6,169,122 | B1 * | 1/2001 | Blizard et al. ................. 521/79 |
| 6,391,408 | B1 | 5/2002 | Hutchinson |
| 2001/0038014 | A1 | 11/2001 | Donelson et al. |
| 2002/0172739 | A1 | 11/2002 | Anderson et al. |
| 2005/0181161 | A1 | 8/2005 | Semersky et al. |
| 2006/0073298 | A1 * | 4/2006 | Hutchinson et al. ...... 428/36.91 |
| 2006/0210746 | A1 | 9/2006 | Shi et al. |
| 2008/0251487 | A1 | 10/2008 | Semersky et al. |
| 2010/0000957 | A1 | 1/2010 | Hutchinson et al. |

* cited by examiner

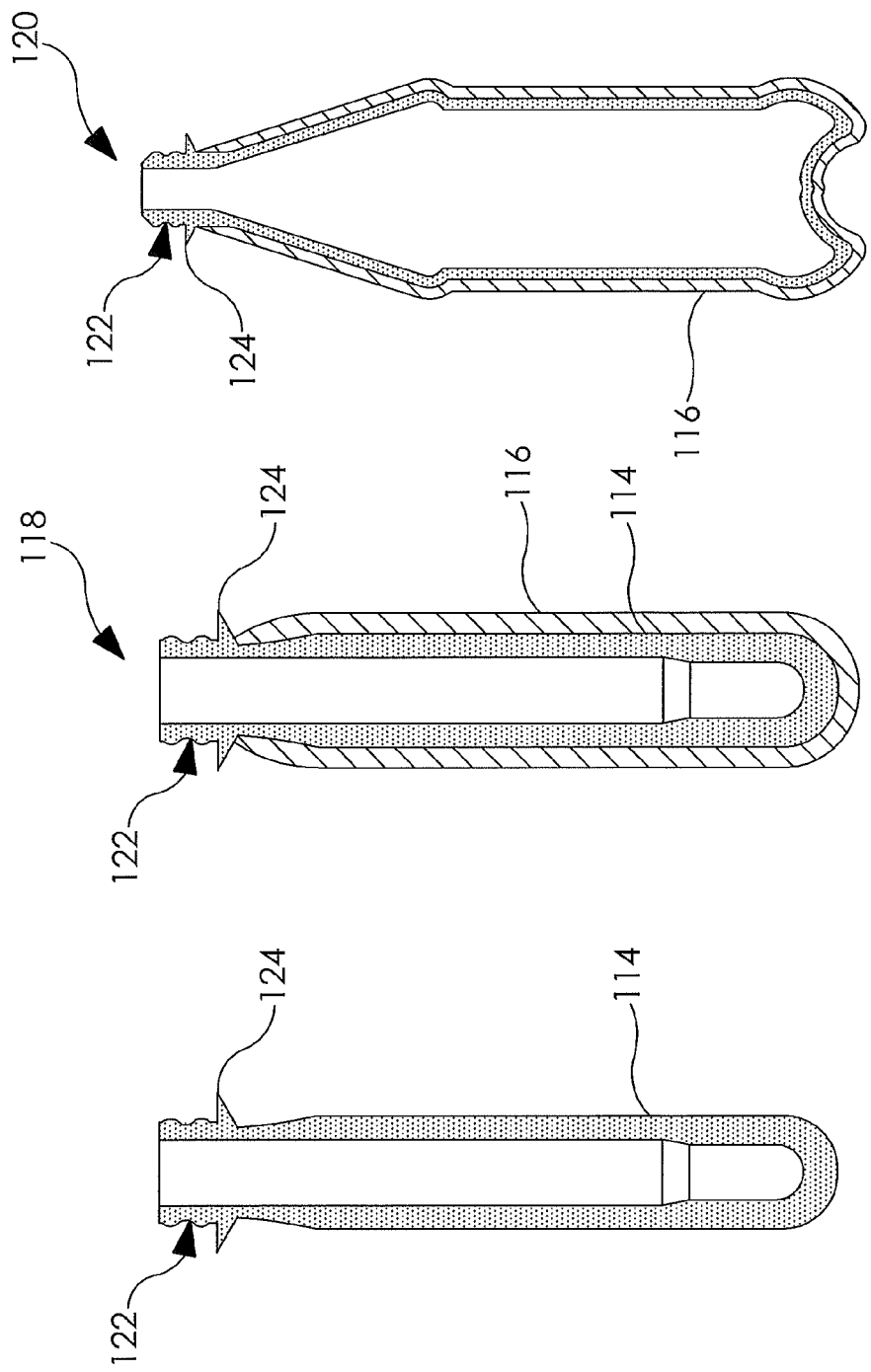

OVERMOLDED CONTAINER HAVING AN INNER FOAMED LAYER

CROSS-REFERENCE TO RELATED APPLICATION

This application is a continuation-in-part of U.S. patent application Ser. No. 12/144,885 filed on Jun. 24, 2008 which is a continuation-in-part of U.S. patent application Ser. No. 11/015,360 filed on Dec. 17, 2004, which claims the benefit of U.S. Provisional Patent Application Ser. No. 60/545,049, filed on Feb. 17, 2004, and a continuation-in-part of U.S. patent application Ser. No. 10/684,611 filed Oct. 14, 2003, which claims the benefit of U.S. Provisional Patent Application Ser. No. 60/422,223, filed on Oct. 30, 2002.

FIELD OF THE INVENTION

The present invention relates generally to a plastic container having a foam layer. More particularly, the invention is directed to an overmolded multi-layered plastic container including an inner layer of foam wherein the foam cells contain carbon dioxide or nitrogen.

BACKGROUND OF THE INVENTION

Biaxially oriented multi-layered bottles may be manufactured from plastic materials such as, for example, polyethylene terephthalate (PET) using a hot preform process, wherein a multi-layered perform is heated to its desired orientation temperature and drawn and blown into conformity with a surrounding mold cavity. The multi-layered preform may be prepared by any conventional process such as, for example, by coinjecting a preform comprising multiple layers of plastic or by injecting subsequent layers of plastic over a previously injection molded preform. Generally, multiple layers are used for food or carbonated beverage containers, to improve the oxygen or carbon dioxide diffusion barrier properties of the overall package.

The various layers of plastics in the prior art multi-layered containers are generally in intimate contact with one another, thereby facilitating the conduction of thermal energy through the walls of the containers. This allows the chilled contents of the container to quickly warm to the ambient temperature. Accordingly, such containers are often sheathed in, for example, a foamed polystyrene shell to impart thermal insulating properties to the container.

It would be desirable to prepare a multi-layered container having improved thermal insulating properties.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is a cross-sectional view of a foamed polymer preform adapted to be overmolded according to another embodiment of the invention;

FIG. 6 is a cross-sectional view of the foamed preform of FIG. 5 overmolded by an unfoamed polymer;

FIG. 7 is a cross-sectional view of an overmolded container formed from the overmolded preform of FIG. 6 according to an embodiment of the invention.

SUMMARY OF THE INVENTION

Figure 3:
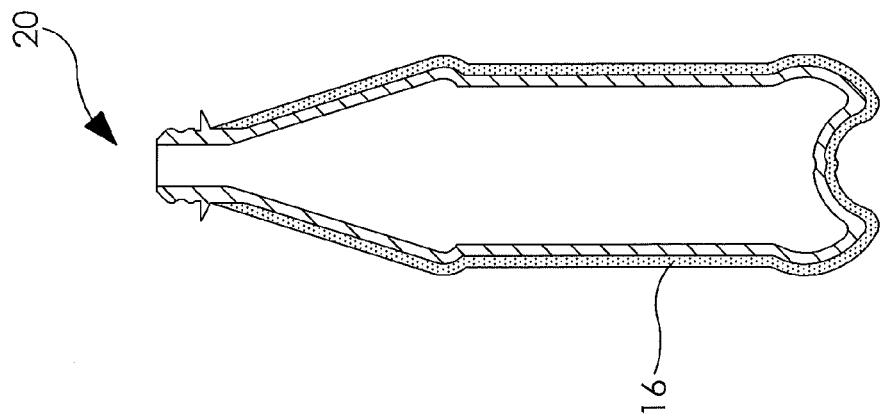
FIG. 3 is a cross-sectional view of an overmolded container formed from the overmolded preform of FIG. 2 according to an embodiment of the invention.

Concordant and congruous with the present invention, an overmolded container exhibiting the properties set forth above has surprisingly been discovered.

In an embodiment of the invention, an overmolded preform suitable for blow molding comprises an inner layer of plastic suitable for blow molding formed from a microcellular foamed polymer, cells of the microcellular foamed polymer containing a non-reactive gas therein; an unfoamed outer layer of plastic suitable for blow molding contacting said inner layer; and an externally threaded finish formed from the microcellular foamed polymer providing communication with an interior of the overmolded preform.

According to another embodiment, a process for preparing a container having a foamed wall, comprises the steps of injection molding a polymer melt having a non-reactive gas entrained therein to form a foamed polymer preform having the non-reactive gas entrapped within the walls thereof, the foamed polymer preform including an externally threaded finish providing communication with an interior thereof; overmolding the foamed polymer preform with an unfoamed polymer; cooling the overmolded preform to a temperature below the polymer softening temperature; reheating the overmolded preform to a temperature greater than the polymer softening temperature; and blow molding the overmolded preform, to prepare a container having an outer unfoamed layer, an inner foamed layer having a non-reactive gas contained within the microcellular foam cells, and the externally threaded finish formed from the foamed layer.

According to another embodiment of the invention, a blow molded plastic container comprises an inner layer of plastic formed from a microcellular foamed polymer, cells of the microcellular foamed polymer containing a non-reactive gas therein; an unfoamed outer layer of plastic suitable for blow molding contacting said inner layer; and an externally threaded finish formed from the microcellular foamed polymer providing communication with an interior of the plastic container.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

An embodiment of the invention is directed to a container comprising a first layer of plastic and a second layer of plastic contacting the first layer, the second layer of plastic formed as a foam wherein the foam cells contain carbon dioxide or nitrogen.

The first and second layers of plastic may be the same or different, in composition, thickness, orientation, etc. Furthermore, the invention contemplates a container having any number (greater than one) of layers of plastics, as long as at least one of the plastic layers comprises a foam. Moreover, the invention contemplates the use of a cellular foam plastic layer wherein the foam cells contain not only carbon dioxide, but also one or more other gasses.

Suitable plastics from which the first and/or second plastic layers may be prepared include, but are not necessarily limited to, polyesters, acrylonitrile acid esters, vinyl chlorides, polyolefins, polyamides, and the like, as well as derivatives, blends, and copolymers thereof. A preferred plastic for one or both of the plastic layers is PET.

In addition to carbon dioxide, the foam cells may contain other gases typically used in processes for making cellular foam structures, including nitrogen, argon, and the like. Preferably, the amount of carbon dioxide present in the foam cells will be from about four percent to about eight percent by weight and possibly up to ten percent by weight. The foam layer acts as an effective thermal insulator, to retard the conduction of heat energy from the atmosphere to the chilled beverage within the container.

The multi-layered container may be produced from a multi-layered preform, by conventional blow molding techniques. The cellular foam plastic layer may be prepared coextensively with the other plastic layer by, for example, a coextrusion process, or the first plastic layer may be applied to or received by the foam plastic layer in a multi-step injection molding process.

To prepare the preform, polymer flakes are melted in a conventional plasticizing screw extruder, to prepare a homogeneous stream of hot polymer melt at the extruder discharge. Typically, the temperature of the polymer melt stream discharged from the extruder ranges from about 225 degrees Centigrade to about 325 degrees Centigrade. One ordinarily skilled in the art will appreciate that the temperature of the polymer melt stream will be determined by several factors, including the kind of polymer flakes used, the energy supplied to the extruder screw, etc. As an example, PET is conventionally extruded at a temperature from about 260 degrees Centigrade to about 290 degrees Centigrade. A non-reactive gas is injected under pressure into the extruder mixing zone, to ultimately cause the entrapment of the gas as microcellular voids within the polymer material. By the term "non-reactive gas" as it is used herein is meant a gas that is substantially inert vis-à-vis the polymer. Preferred non-reactive gases comprise carbon dioxide, nitrogen, and argon, as well as mixtures of these gases with each other or with other gasses.

It is well-known that the density of amorphous PET is 1.335 grams per cubic centimeter. It is also known that the density of PET in the melt phase is about 1.200 grams per cubic centimeter. Thus, if the preform injection cavity is filled completely with molten PET and allowed to cool, the resulting preform would not exhibit the proper weight and would have many serious deficiencies, such as sink marks. The prior art injection molding literature teaches that, in order to offset the difference in the densities of amorphous and molten PET, a small amount of polymer material must be added to the part after the cavity has been filled and as the material is cooling. This is called the packing pressure. Thus, about ten percent more material must be added during the packing pressure phase of the injection molding cycle in order to insure that a preform made by injection molding is filled adequately and fully formed. The packing pressure phase of the injection molding operation is likewise used for polymer materials other than PET.

According to the present invention however, the polymer preform is injection molded and simultaneously foamed using a non-reactive gas. The gas is entrapped in the material during the injection phase. Contrary to the prior art injection molding process, wherein additional polymer material is injected during the packing phase, the present invention utilizes minimal packing pressure. As the polymer material is still in a molten state, the partial pressure of the non-reactive gas is sufficient to permit the release of the dissolved gas from the polymer into the gas phase where it forms the microcellular foam structure. Thus, the preform made by the inventive process weighs less than, but has the same form and geometry as, the polymer preforms produced by the conventional injection molding operations that employ the packing process.

During the injection molding step, as the preform cavity is being filled with polymer, bubbles of gas are form at the flow front of the polymer due to the pressure drop between the gas dissolved in the polymer melt and the relatively lower localized pressure in the preform cavity. The bubbles formed at the flow front of the polymer melt as it is introduced into the preform mold cavity are subsequently deposited on the outside and inside surfaces of the preform. Thus, macroscopically, the cross-section of the preform shows a non-uniform structure having a foamed region sandwiched between two unfoamed regions, the unfoamed regions being the plastic material which hardened at the interface of the polymeric material and the cold mold surfaces of the cavity and the core rod, respectively, prior to the release of pressure in the cavity. To the inside and outside of this structure are microscopically thin regions of open-cell foam as a result of the bubbles erupting at the flow front. Closed-cell foam layers may be disposed between the open-cell foam layers and the unfoamed layer. The preform having this foamed core section is then blow molded in a conventional fashion to produce a container having a multi-regioned structure in concordance with the multi-regioned structure of the preform.

Upon completion of the injection molding step, the preform is cooled to a temperature below the polymer softening temperature. For example, the softening temperature for PET is approximately 70 degrees Centigrade. Thus, the entrapped non-reactive gas is retained within the walls of the polymer preform. This cooling step is critical to the inventive process, as it conditions the polymer and preserves its desirable properties for the successful preparation of a blow molded container. This cooling step is also necessary when employing polymers such as polyesters, which cannot be blow molded directly from an extruded parison. This cooling step may be effected by any conventional process used in the polymer forming art such as, for example, by passing a stream of a cooling gas over the surfaces of the preform, or cooling the preform while in-mold by cooling the forming mold.

The preform is thereafter reheated to a temperature above the polymer softening temperature. This heating step may be effected by well-known means such as, for example, by exposure of the preform to a hot gas stream, by flame impingement, by exposure to infra-red energy, by passing the preform through a conventional oven, or the like. PET is generally reheated to a temperature twenty to twenty-five degrees above its softening temperature for the subsequent blow molding operation. If PET is reheated too far above its glass transition temperature, or held at a temperature above its softening temperature for an excessive period of time, the PET undesirably will begin to crystallize and turn white. Likewise, if the preform is heated to a temperature above which the mechanical properties of the material are exceeded by the increasing pressure of the non-reactive gas in the microcells, the microcells undesirably will begin to expand thus distorting the preform.

Finally, the preform is blow molded, to prepare a container, consisting essentially of a microcellular foamed polymer having a non-reactive gas contained within the microcellular foam cells. Methods and apparatus for blow molding a container from a polymer preform are well-known.

One ordinarily skilled in the art will readily appreciate that the number and types of plastic layers used, and the various means, chemical and physical, used to produce a foam layer, can be varied over wide limits to produce a variety of contemplated multi-layered containers comprising a first layer of plastic and a second layer of plastic contacting said first layer, said second layer of plastic formed as a foam wherein the foam cells contain carbon dioxide, according to the present invention.

Figure 2:
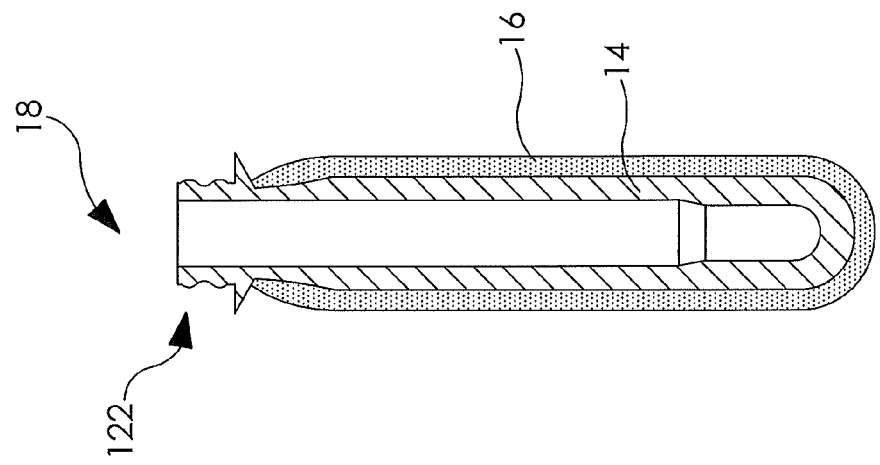
FIG. 2 is a cross-sectional view of the unfoamed preform of FIG. 1 overmolded by a foamed polymer.
Figure 1:
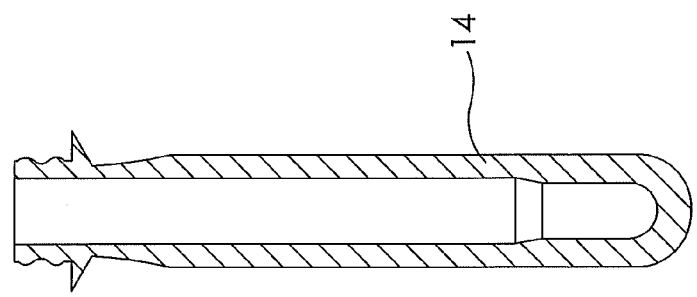
FIG. 1 is a cross-sectional view of an unfoamed polymer preform adapted to be overmolded.

FIG. 2 is an overmolded preform 18 according to an embodiment of the invention. To form the overmolded preform 18, a preform 14 adapted to be overmolded is provided, as shown in FIG. 1. The preform 14 is made by injection molding a plastic material such as, for example, polyethylene terephthalate (PET) using processes and equipment known in the art.

The preform 14 is then overmolded with a foamed material 16 to form the overmolded preform 18. The overmolded preform 18 includes an inner layer formed from the preform 14 and an outer foamed layer formed from the foamed material 16. Suitable plastics from which the foamed material 16 may be prepared include, but are not necessarily limited to, polyesters, acrylonitrile acid esters, vinyl chlorides, polyolefins, polyamides, and the like, as well as derivatives, blends, and copolymers thereof. A preferred plastic for the foamed material 16 is PET. The foamed material 16 may be coextensively formed with the material forming the preform 14 by a coextrusion process, or the foamed material 16 may be applied to or received by the preform 14 by simultaneously injection molding the foamed material 16 and the material forming the preform 14. Alternatively, the foamed material 16 may be formed with preform 14 in a multi-step process such as a multi-step injection molding process. The overmolded preform 18 may be formed in the same mold in which the preform 14 is made by using the multi-step injection molding process, or the preform 14 may be transferred to a second mold for the overmolding step by using an insert molding process. The thickness and surface area of the foamed material 16 overmolded onto the preform 14 will vary based upon design considerations such as cost and a desired appearance of the overmolded container 20.

Next, the overmolded preform 18 is blow molded to form the overmolded container 20 having an outer foamed layer and an inner unfoamed layer, as shown in FIG. 3. The overmolded container 20 may be formed by conventional blow molding techniques, such as reheat stretch blow molding.

Figure 4:
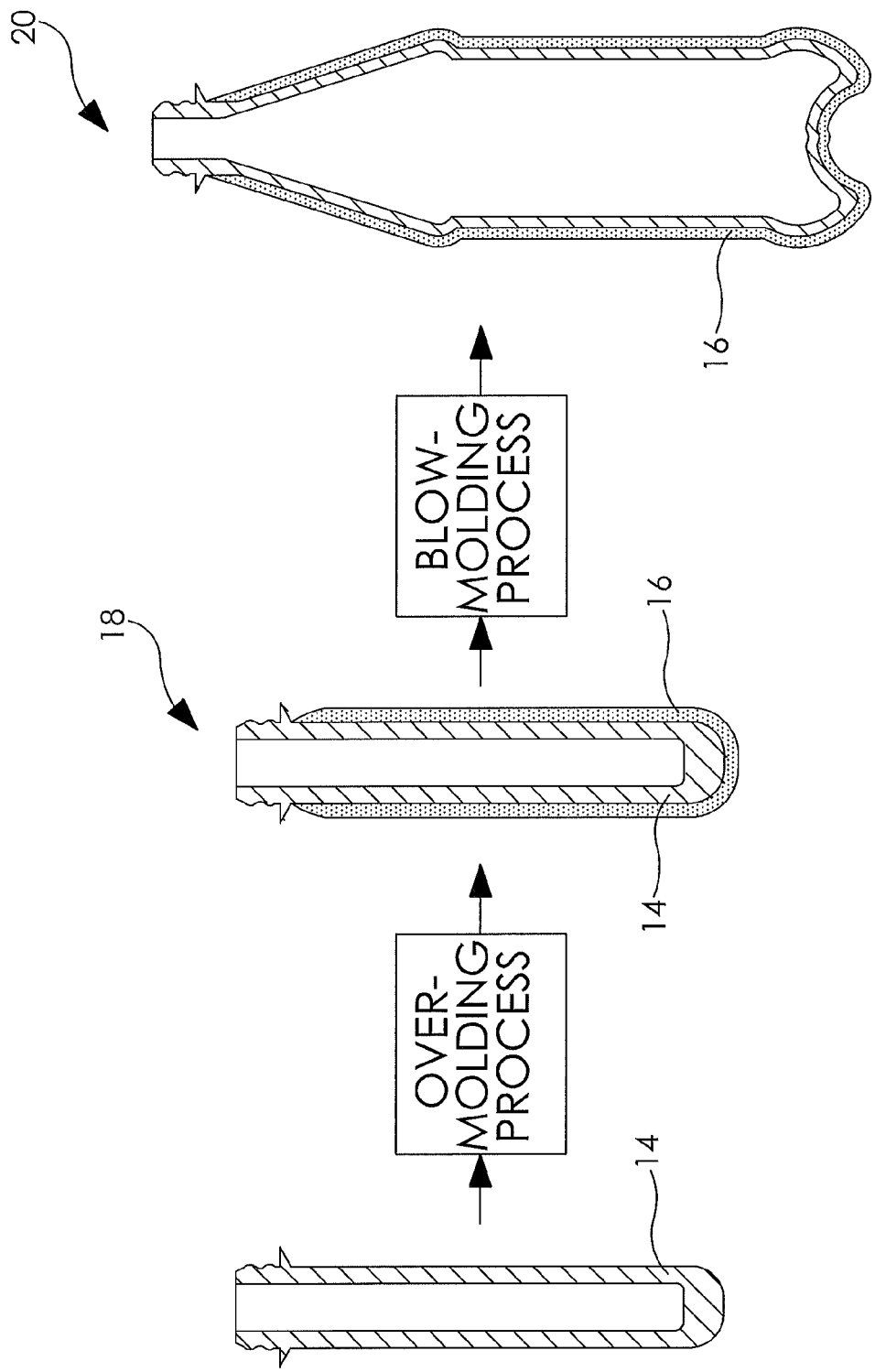
FIG. 4 is a schematic illustration of a process for preparing the overmolded preform of FIG. 2 and the overmolded container of FIG. 3 according to another embodiment of the invention.

According to another embodiment of the invention, a process for preparing the overmolded preform 18 and the overmolded container 20 is schematically illustrated in FIG. 4. First, a polymer melt of the foamed material 16 of the overmolded preform 18 is prepared and then overmolded onto the preform 14. The polymer melt is formed from polymer flakes melted in a conventional plasticizing screw extruder, to prepare a homogeneous stream of hot polymer melt at the extruder discharge. Typically, the temperature of the polymer melt stream discharged from the extruder ranges from about 225 degrees Centigrade to about 325 degrees Centigrade. One ordinarily skilled in the art will appreciate that the temperature of the polymer melt stream will be determined by several factors, including the kind of polymer flakes used, the energy supplied to the extruder screw, etc. As an example, PET is conventionally extruded at a temperature from about 260 degrees Centigrade to about 290 degrees Centigrade. A non-reactive gas is injected under pressure into the extruder mixing zone, to ultimately cause the entrapment of the gas as microcellular voids within the polymer material. By the term "non-reactive gas" as it is used herein is meant a gas that is substantially inert vis-à-vis the polymer. Preferred non-reactive gases comprise carbon dioxide, nitrogen, and argon, as well as mixtures of these gases with each other or with other gasses.

The extrudate is injection molded over the preform 14 to form the overmolded preform 18 having an outer foamed layer with the non-reactive gas entrapped within the walls thereof. Methods and apparatus for injection overmolding a polymer preform are well-known in the art.

It is well-known that the density of amorphous PET is 1.335 grams per cubic centimeter. It is also known that the density of PET in the melt phase is about 1.200 grams per cubic centimeter. Thus, if the preform injection cavity is filled completely with molten PET and allowed to cool, the resulting preform would not exhibit the proper weight and would have many serious deficiencies, such as sink marks. The prior art injection molding literature teaches that, in order to offset the difference in the densities of amorphous and molten PET, a small amount of polymer material must be added to the part after the cavity has been filled and as the material is cooling. This is called the packing pressure. Thus, about ten percent more material must be added during the packing pressure phase of the injection molding cycle in order to insure that a preform made by injection molding is filled adequately and fully formed. The packing pressure phase of the injection molding operation is likewise used for polymer materials other than PET.

According to the present invention however, the preform 14 is overmolded with the polymer melt and simultaneously foamed using a non-reactive gas. The gas is entrained in the material during the injection phase. Contrary to the prior art injection molding process, wherein additional polymer material is injected during the packing phase, the present invention utilizes minimal packing pressure. As the polymer material is still in a molten state, the partial pressure of the non-reactive gas is sufficient to permit the release of the dissolved gas from the polymer into the gas phase where it forms the microcellular foam structure. Thus, the overmolded preform 18 made by the inventive process weighs less than, but has the same form and geometry as, the polymer preforms produced by the conventional injection molding operations that employ the packing process.

Upon completion of the injection molding step, the overmolded preform 18 is cooled to a temperature below the polymer softening temperature. For example, the softening temperature for PET is approximately 70 degrees Centigrade. Thus, the entrapped non-reactive gas is retained within the walls of the overmolded preform 18. This cooling step is critical to the inventive process, as it conditions the polymer and preserves its desirable properties for the successful preparation of the overmolded container 20. This cooling step is also necessary when employing polymers such as polyesters, which cannot be blow molded directly from an extruded parison. This cooling step may be effected by any conventional process used in the polymer forming art such as, for example, by passing a stream of a cooling gas over the surfaces of the overmolded preform 18, or cooling the overmolded preform 18 while in-mold by cooling the forming mold.

The overmolded preform 18 is thereafter reheated to a temperature above the polymer softening temperature. This heating step may be effected by well-known means such as, for example, by exposure of the overmolded preform 18 to a hot gas stream, by flame impingement, by exposure to infra-red energy, by passing the overmolded preform 18 through a conventional oven, or the like. PET is generally reheated to a temperature twenty to twenty-five degrees above its softening temperature for the subsequent blow molding operation. If PET is reheated too far above its glass transition temperature, or held at a temperature above its softening temperature for an excessive period of time, the PET undesirably will begin to crystallize and turn white. Likewise, if the overmolded preform 18 is heated to a temperature above which the mechanical properties of the material are exceeded by the increasing pressure of the non-reactive gas in the microcells, the microcells undesirably will begin to expand thus distorting the overmolded preform 18.

Finally, the overmolded preform 18 is blow molded, to prepare the overmolded container 20 having a unfoamed inner layer and a microcellular foamed polymer outer layer having a non-reactive gas contained within the microcellular foam cells. Methods and apparatus for blow molding a container from a polymer preform are well-known.

In addition to the preferred gases, the microcells may contain other gases typically used in processes for making microcellular foam structures. Moreover, the microcellular foam acts as an effective thermal insulator, to retard the conduct of heat energy from the atmosphere to the chilled carbonated beverage within the container.

FIG. 6 is an overmolded preform 118 according to another embodiment of the invention. To form the overmolded preform 118, a preform 114 adapted to be overmolded is provided, as shown in FIG. 5. The preform 114 is made by simultaneously injection molding and foaming a polymeric material using a process described in more detail below. The preform 114 includes a threaded finish 122 adapted to receive a corresponding closure and a shoulder 124 for handling the preform 114 during a blow molding process. The threaded finish 122 and the shoulder 124, like the sidewalls of the preform 114, are formed from the foamed material. Suitable plastics from which the foamed material may be prepared include, but are not necessarily limited to, polyesters, acrylonitrile acid esters, vinyl chlorides, polyolefins, polyamides, and the like, as well as derivatives, blends, and copolymers thereof. A preferred plastic for the foamed material is PET.

The overmolded preform 118 is formed by overmolding the preform 114 with an unfoamed material 116 formed from a plastic material such as, for example, polyethylene terephthalate (PET) using processes and equipment known in the art. As shown in FIG. 6, the overmolded preform 118 includes an inner layer formed from the foamed preform 114 and an outer unfoamed layer formed from the unfoamed material 116. The thickness and surface area of the unfoamed material 116 overmolded onto the foamed preform 114 will vary based upon design considerations such as cost and a desired appearance of a resulting overmolded container 120 (shown in FIG. 7).

It is understood that the foamed material forming the preform 114 may be coextensively formed with the unfoamed material 116 of the outer layer by a coextrusion process, or the unfoamed material 116 may be applied to or received by the preform 114 by simultaneously injection molding the unfoamed material and the foamed material forming the preform 114. Alternatively, the unfoamed material of the outer layer may be formed with the foamed preform 114 in a multi-step process such as a multi-step injection molding process. The overmolded preform 118 may be formed in the same mold in which the foamed preform 114 is made by using the multi-step injection molding process, or the foamed preform 114 may be transferred to a second mold for the overmolding step by using an insert molding process.

Next, the overmolded preform 118 is blow molded to form the overmolded container 120 having an inner foamed layer and an outer unfoamed layer, as shown in FIG. 7. The overmolded container 120 includes the threaded finish 122 and the shoulder 124 both formed from the foamed material. The overmolded container 120 may be formed by conventional blow molding techniques, such as reheat stretch blow molding.

Figure 8:
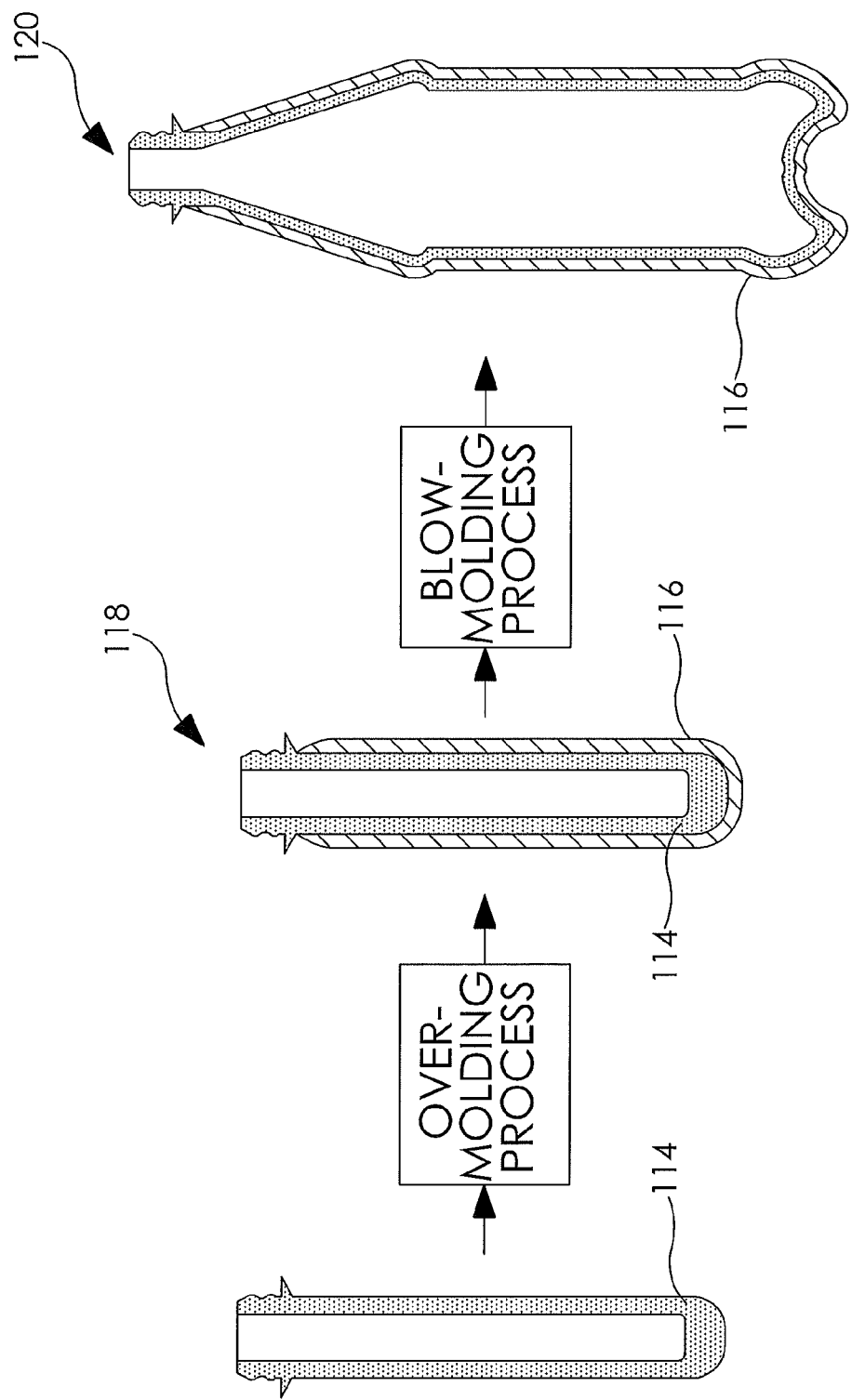
FIG. 8 is a schematic illustration of a process for preparing the overmolded preform of FIG. 6 and the overmolded container of FIG. 7 according to another embodiment of the invention.

According to another embodiment of the invention, a process for preparing the overmolded preform 118 and the overmolded container 120 is schematically illustrated in FIG. 8. First, a polymer melt is injection molded to form the foamed preform 114. The polymer melt is formed from polymer flakes melted in a conventional plasticizing screw extruder, to prepare a homogeneous stream of hot polymer melt at the extruder discharge. Typically, the temperature of the polymer melt stream discharged from the extruder ranges from about 225 degrees Centigrade to about 325 degrees Centigrade. One ordinarily skilled in the art will appreciate that the temperature of the polymer melt stream will be determined by several factors, including the kind of polymer flakes used, the energy supplied to the extruder screw, etc. As an example, PET is conventionally extruded at a temperature from about 260 degrees Centigrade to about 290 degrees Centigrade. A non-reactive gas is injected under pressure into the extruder mixing zone, to ultimately cause the entrapment of the gas as microcellular voids within the polymer material. By the term "non-reactive gas" as it is used herein is meant a gas that is substantially inert vis-à-vis the polymer. Preferred non-reactive gases comprise carbon dioxide, nitrogen, and argon, as well as mixtures of these gases with each other or with other gasses.

It is well-known that the density of amorphous PET is 1.335 grams per cubic centimeter. It is also known that the density of PET in the melt phase is about 1.200 grams per cubic centimeter. Thus, if the preform injection cavity is filled completely with molten PET and allowed to cool, the resulting preform would not exhibit the proper weight and would have many serious deficiencies, such as sink marks. The prior art injection molding literature teaches that, in order to offset the difference in the densities of amorphous and molten PET, a small amount of polymer material must be added to the part after the cavity has been filled and as the material is cooling. This is called the packing pressure. Thus, about ten percent more material must be added during the packing pressure phase of the injection molding cycle in order to insure that a preform made by injection molding is filled adequately and fully formed. The packing pressure phase of the injection molding operation is likewise used for polymer materials other than PET.

According to the present invention however, the preform 114 is formed by simultaneously injection molding and foaming the polymer melt using the non-reactive gas. The gas is entrained in the material during the injection phase. Contrary to the prior art injection molding process, wherein additional polymer material is injected during the packing phase, the present invention utilizes minimal packing pressure. As the polymer material is still in a molten state, the partial pressure of the non-reactive gas is sufficient to permit the release of the dissolved gas from the polymer into the gas phase where it forms the voids/microcellular foam structure. Thus, the overmolded preform 118 made by the inventive process weighs less than, but has the same form and geometry as, the polymer preforms produced by the conventional injection molding operations that employ the packing process.

As described above, the microcellular foam structure is formed by the release of the dissolved non-reactive gas from the polymer into the gas phase, and not from a chemical blowing agent. Chemical blow agents are known to decompose during processing to form water and other organic materials that contaminate the polymer. If the polymer is PET, the water will degrade the polymer, thereby resulting in a preform having undesirable quality.

The overmolded preform 118 is then formed by overmolding the foamed preform 114 with the unfoamed material 116. An extrudate of unfoamed material is injection molded over the preform 114 to form the overmolded preform 118 having an outer unfoamed layer and an inner foamed layer with the non-reactive gas entrapped within the walls thereof. Methods and apparatus for injection overmolding an unfoamed material are well-known in the art.

Upon completion of the injection molding step, the overmolded preform 118 is cooled to a temperature below the polymer softening temperature. For example, the softening temperature for PET is approximately 70 degrees Centigrade. Thus, the entrapped non-reactive gas is retained within the walls of the overmolded preform 118. This cooling step is critical to the inventive process, as it conditions the polymer and preserves its desirable properties for the successful preparation of the overmolded container 120. This cooling step is also necessary when employing polymers such as polyesters, which cannot be blow molded directly from an extruded parison. This cooling step may be effected by any conventional process used in the polymer forming art such as, for example, by passing a stream of a cooling gas over the surfaces of the overmolded preform 118, or cooling the overmolded preform 118 while in-mold by cooling the forming mold.

The overmolded preform 118 is thereafter reheated to a temperature above the polymer softening temperature. This heating step may be effected by well-known means such as, for example, by exposure of the overmolded preform 118 to a hot gas stream, by flame impingement, by exposure to infra-red energy, by passing the overmolded preform 118 through a conventional oven, or the like. PET is generally reheated to a temperature twenty to twenty-five degrees above its softening temperature for the subsequent blow molding operation. If PET is reheated too far above its glass transition temperature, or held at a temperature above its softening temperature for an excessive period of time, the PET undesirably will begin to crystallize and turn white. Likewise, if the overmolded preform 118 is heated to a temperature above which the mechanical properties of the material are exceeded by the increasing pressure of the non-reactive gas in the microcells, the microcells undesirably will begin to expand thus distorting the overmolded preform 118.

Finally, the overmolded preform 118 is blow molded, to prepare the overmolded container 120 having a non-foamed inner layer and a microcellular foamed polymer outer layer having a non-reactive gas contained within the microcellular foam cells. Methods and apparatus for blow molding a container from a polymer preform are well-known.

In addition to the preferred gases, the microcells may contain other gases typically used in processes for making microcellular foam structures. Moreover, the microcellular foam acts as an effective thermal insulator, to retard the conduct of heat energy from the atmosphere to the chilled carbonated beverage within the container.

In another embodiment of the invention, one or more of the foamed and unfoamed layer(s) is colored. That is, the foamed preform 114 may be colored while the unfoamed material 116 is uncolored; the foamed preform 114 may be uncolored while the unfoamed material 116 is colored; or both the foamed preform 114 and the unfoamed material 116 may be colored, as desired. It is understood that colored may mean tinted and translucent or opaque. Typically, the unfoamed material 116 is colorless and clear while the foamed preform 116 may range in color from white to a silvery color. Therefore, colored also means any color other than white or silvery.

From the foregoing description, one ordinarily skilled in the art can easily ascertain the essential characteristics of the invention, and without departing from its spirit and scope, can make various changes and modifications to adapt the invention to various uses and conditions.

We claim:

1. A blow molded plastic container comprising:
an inner layer of plastic formed from a microcellular foamed polymer, cells of the microcellular foamed polymer containing one of carbon dioxide and nitrogen gas therein; and
an unfoamed outer layer of plastic comprising biaxially oriented polyethylene terephthalate formed separately from the inner layer via an overmolding process but directly contacting said inner layer, said container made by blow molding a preform formed from said inner layer of plastic and said outer layer of plastic.

2. The blow molded plastic container of claim 1, wherein at least one of said inner layer and said unfoamed outer layer are colored.

3. The blow molded plastic container of claim 1, wherein said outer layer of plastic and said inner layer of plastic are the same.

4. The blow molded plastic container of claim 1, wherein said outer layer of plastic and said inner layer of plastic are different.

5. The blow molded plastic container of claim 1, wherein the foam cells of said inner layer are formed without a chemical blowing agent.

* * * * *